(12) United States Patent
Tsai et al.

(10) Patent No.: US 11,613,011 B2
(45) Date of Patent: Mar. 28, 2023

(54) MECHANICAL ARM SYSTEM AND MECHANICAL ARM CONTROL METHOD

(71) Applicant: Delta Electronics, Inc., Taoyuan (TW)

(72) Inventors: Ching-Hsiung Tsai, Taoyuan (TW); Ming-Yang Cheng, Taoyuan (TW); Chung-Chan Hsu, Taoyuan (TW); Chia-Hui Chen, Taoyuan (TW); Hao-Lun Huang, Taoyuan (TW); Kuan-Shun Chao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 414 days.

(21) Appl. No.: 16/927,247

(22) Filed: Jul. 13, 2020

(65) Prior Publication Data
US 2021/0162594 A1   Jun. 3, 2021

(30) Foreign Application Priority Data

Dec. 3, 2019   (CN) .......................... 201911217337.7

(51) Int. Cl.
*H02P 7/00* (2016.01)
*B25J 9/16* (2006.01)
*G05B 19/23* (2006.01)

(52) U.S. Cl.
CPC .......... *B25J 9/1633* (2013.01); *G05B 19/234* (2013.01); *B25J 9/1638* (2013.01)

(58) Field of Classification Search
CPC ..... B25J 9/1633; B25J 9/1638; G05B 19/234; G05B 19/39261; G05B 19/39195; G05B 13/042; G05B 17/02
See application file for complete search history.

(56) References Cited

FOREIGN PATENT DOCUMENTS

| CN | 104827468 A | 8/2015 | |
|---|---|---|---|
| CN | 105479459 A | 4/2016 | |
| CN | 106457560 A | 2/2017 | |
| CN | 106527177 A | * 3/2017 | ............. G05B 17/02 |

* cited by examiner

*Primary Examiner* — Karen Masih
(74) *Attorney, Agent, or Firm* — Muncy, Geissler, Olds & Lowe, P.C.

(57) ABSTRACT

A mechanical arm system includes at least two links, at least two control devices and at least two motor devices. Each of the control devices includes a first control unit, a mechanical arm control unit and a driving unit. The first control unit receives an end-position command to output a first torque signal. The mechanical arm control unit includes a rigid mechanical unit and a mechanical model unit. The rigid mechanical unit receives the first torque signal to obtain a rigid mechanical torque, and the mechanical model unit receives the rigid mechanical torque and operates the flexible mechanical model to establish the mechanical arm model for obtaining the target torque, and the target position signal is output according to the target torque. The driving unit generates a driving signal according to the target position signal to adjust a rotation angle of the corresponding motor device.

20 Claims, 6 Drawing Sheets

MECHANICAL ARM SYSTEM AND MECHANICAL ARM CONTROL METHOD

CROSS REFERENCE TO RELATED APPLICATIONS

This application claims priority of CN Application No. 201911217337.7, filed on Dec. 3, 2019, the entirety of which is incorporated by reference herein.

BACKGROUND OF THE INVENTION

Field of the Invention

The present invention relates to a mechanical arm system and, in particular, to a mechanical arm system having a distribution control system and a control method thereof.

Description of the Related Art

There has been technical development in mechanical arm systems, which are widely used in industry and manufacturing. In order to cope with the needs of future Industry 4.0, the accuracy requirements and application scopes of the mechanical arm system are gradually increasing.

However, the current mechanical arm systems rely on a central processing system (such as a central processing unit or a central control unit) to perform various operations. With the increasing demands of the manufacturing industry, the current mechanical arm systems have been design with multiple links (also called as axes or axes of link). Since the calculation of each of links of a mechanical arm system is different, the computation load is too heavy for the central processing system of the mechanical arm system. Therefore, the central processing system may not be able to afford to assign the required computational resources toward performing such a large amount of calculations.

In addition, each of the links of the current mechanical arm system has a processor (a control unit, a control chip, or another control devices). Because the central processing system is responsible for most of the calculations for the mechanical arm system, the processors in each link are often idle. As a result, the current control method for the mechanical arm system is liable to waste hardware resources and raise costs. Furthermore, because the central processing system is responsible for most of the calculations for the mechanical arm system, it is difficult for the central processing system to deal with other operations. Therefore, it is difficult for the architecture of the current mechanical arm system to be more widely applied and designed.

BRIEF SUMMARY OF THE INVENTION

In view of this, the present invention proposes a mechanical arm system having a distribution control system. The calculation of each link is calculated independently by the control device of each link so that the calculation load of the central processing system is reduced. In this way, the mechanical arm system of the present invention can maximize the use of hardware resources, reduce costs, and increase the scope of applications.

A mechanical arm system comprises at least two links, at least two control devices and at least two motor devices, wherein each of the at least two control devices respectively controls the at least two motor devices to respectively adjust positions of the at least two links. Each of the at least two control devices comprises a first control unit, a mechanical arm control unit, a driving unit and a measurement processing unit. The first control unit is configured to receive an end-position command to output a first torque signal. The mechanical arm control unit comprises a rigid mechanical arm model and a flexible mechanical arm model, wherein the mechanical arm control unit receives the first torque signal to obtain a rigid mechanical torque through the rigid mechanical arm model, and the mechanical arm control unit creates a mechanical arm model based on the rigid mechanical torque and the flexible mechanical arm model to obtain a target torque and outputs a target position signal based on the target torque. The driving unit is configured to generate a driving signal to adjust a rotatory angle of the corresponding motor device based on the target position signal. The measurement processing unit is configured to measure the rotatory angle, a rotatory speed and a rotatory acceleration of the corresponding motor device. The mechanical arm control unit of one of the at least two control devices receives rotatory angle(s), rotatory speed(s) and rotatory acceleration(s) of the corresponding motor devices of the other at least two control devices for adjusting the rigid mechanical arm model to change the rigid mechanical torque.

A mechanical arm system comprises a link, a motor device coupled to the link and a control device coupled to the motor device, wherein the control device comprises a first control unit, a mechanical arm control unit, a driving unit and a measurement processing unit. The first control unit is configured to receive an end-position command to output a first torque signal. The mechanical arm control unit comprises a rigid mechanical arm model and a flexible mechanical arm model, wherein the mechanical arm control unit receives the first torque signal to obtain a rigid mechanical torque through the rigid mechanical model, and the mechanical arm control unit creates a mechanical arm model to obtain a target torque based on the rigid mechanical torque and the flexible mechanical model, and the mechanical arm control outputs a target position signal based on the target torque. The driving unit is configured to generate a driving signal based on the target position signal to adjust a rotatory angle of the motor device. The measurement processing unit is configured to measure the motor device to output kinematic parameters of the motor device, wherein the kinematic parameters comprises the rotatory angle, a rotatory speed and a rotatory acceleration. The mechanical arm control unit receives the kinematic parameters of the motor device to adjust the rigid mechanical model to change the rigid mechanical torque.

A mechanical arm control method is performed by a mechanical arm system. The mechanical arm system comprises at least two links, at least two control devices and at least two motor devices, wherein each of the at least two control devices respectively controls the corresponding at least two motor devices to respectively adjust positions of the corresponding at least two links, wherein each of the at least two control devices performs the mechanical arm control method, comprising: receiving an end-position command to output a first torque signal; receiving the first torque signal and operating a rigid mechanical model to obtain a rigid mechanical torque; creating a mechanical arm model to obtain a target torque based on the rigid mechanical torque and a flexible mechanical model; outputting a target position signal based on the target torque; generating a driving signal to adjust a rotatory angle of the corresponding motor device based on the target position signal; and measuring the rotatory angle, a rotatory speed and a rotatory acceleration of the corresponding motor device. The one of the at least two control devices receives rotatory angle(s), rotatory speed(s) and rotatory acceleration(s) of the corresponding motor devices of the other at least two control devices for adjusting the rigid mechanical model of the one of the at least two control devices to change the rigid mechanical torque.

DETAILED DESCRIPTION OF THE INVENTION

Figure 1:
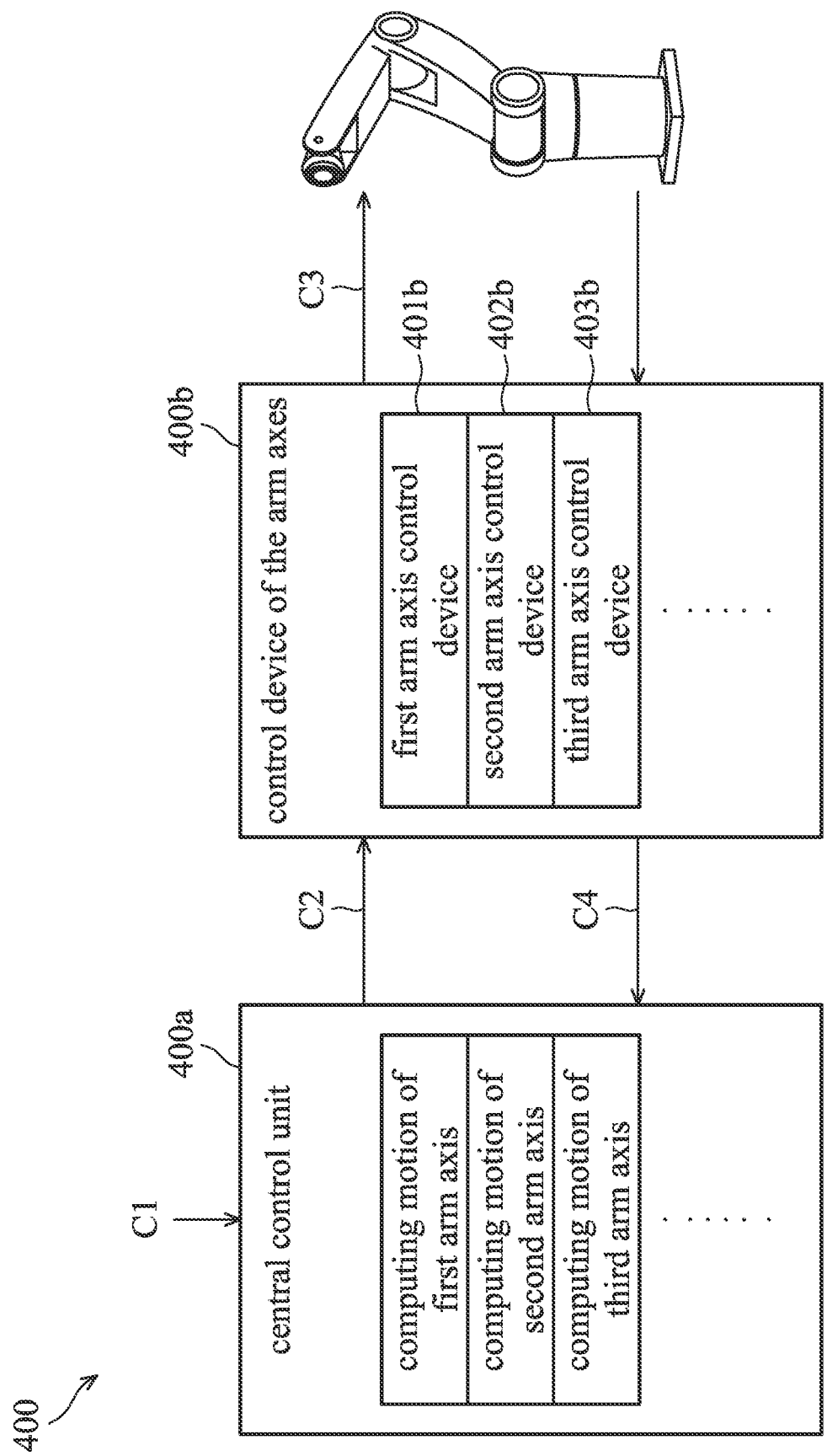
FIG. 1 is a block diagram of a mechanical arm system in accordance with one embodiment of the traditional techniques.

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The following description is an embodiment of the present invention. The purpose of the present invention is to exemplify the general principles of the invention and should not be construed as limiting the scope of the invention, which is defined by the scope of the claims.

FIG. 1 is a block diagram of a mechanical arm system 400 in accordance with one embodiment of the traditional techniques. As shown in FIG. 1, in the traditional mechanical arm system 400, when the central control unit receives the motion control command C1, the central control unit 400a calculates the motion of each link according to the motion control command C1, and the central control unit 400a outputs the torque commands C2 of each link to the control device 400b of the links. The control device 400b of the links comprises a plurality of the arm control devices, such as the first to third arm control devices 401b~403b. The first to third arm control devices 401b~403b output the motor current commands to drive each motor of the each links based on the torque commands C2. Then, the control device 400b of the links detects the motion states of each link. The central control unit 400a receives the motion states C4 of the links by the control device 400b of the links. It can be known that the central control unit 400a of the traditional mechanical arm system 400 is mainly responsible for the calculation of each link.

The conventional mechanical arm system 400 obviously does not make good use of the hardware resources of the control device 400b of each link. In addition, because of the various demands in the market, the number of links of the mechanical arm system needs to be adjusted more flexibly. However, because the hardware resources of the central control unit 400a of the traditional mechanical arm system 400 are limited, the traditional mechanical arm system 400 cannot be designed more flexibly.

In addition, the control method of the conventional mechanical arm system 400 is also less suitable for a flexible mechanical arm. During the movement of the flexible mechanical arm, the end position of the mechanical arm will oscillate. Due to the data transmission delay of the traditional robotic arm system 400, it is difficult to reflect the oscillation phenomenon of the end position of the high-frequency links, so the accuracy of the traditional mechanical arm system 400 is difficult to be improved.

Figure 2:
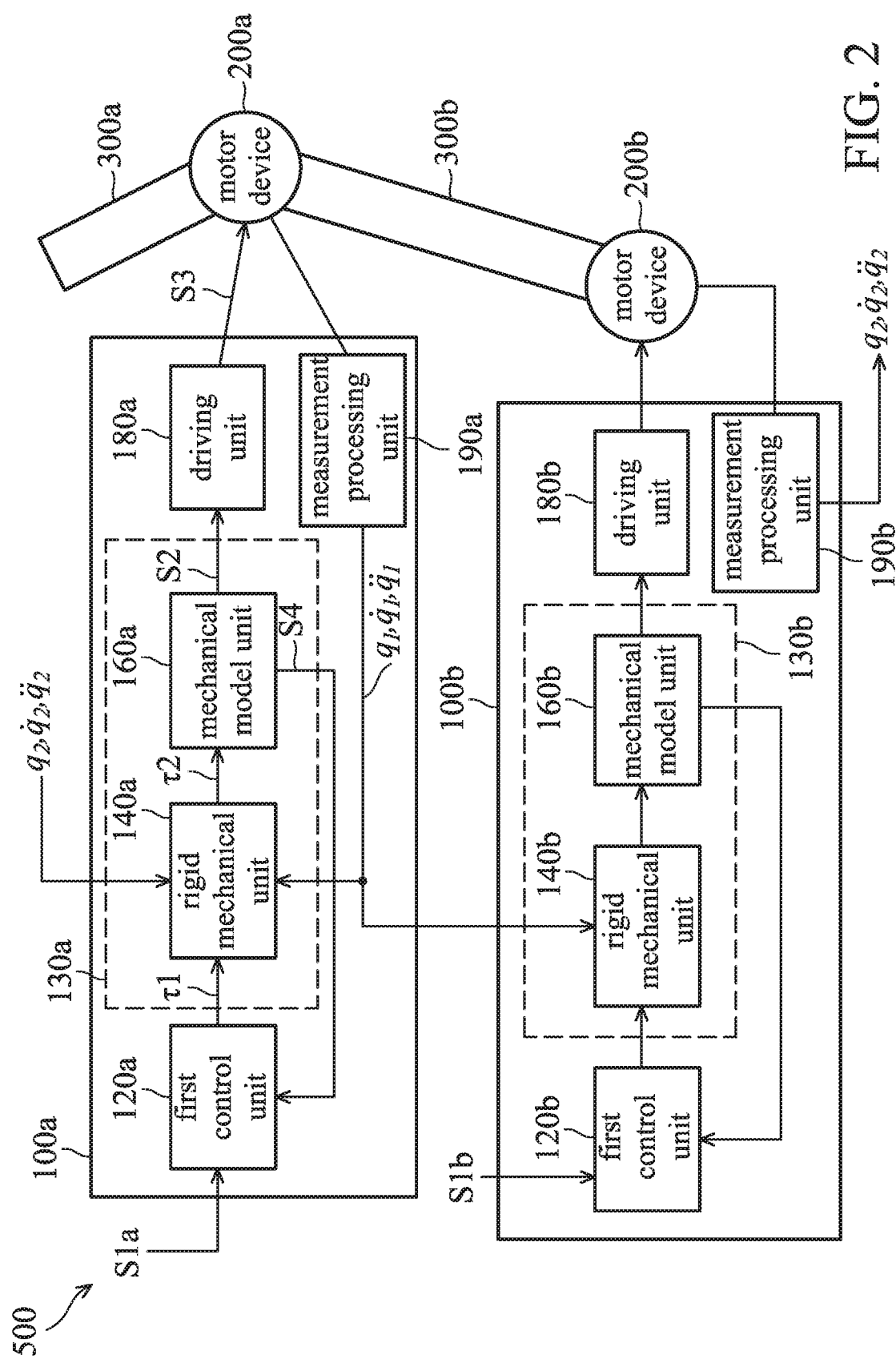
FIG. 2 is a block diagram of a mechanical arm system in accordance with one embodiment of the present invention.

FIG. 2 is a block diagram of a mechanical arm system in accordance with one embodiment of the present invention. As shown in FIG. 2, the mechanical arm system 500 comprises at least two links (300a and 300b), at least two control devices (100a and 100b) and at least two motor devices (200a and 200b). The at least two control devices respectively control the corresponding motor devices to adjust the positions of the corresponding links. That is, in this embodiment, the control device 100a controls the motor device 200a to adjust the position of the link 300a. The control device 100b controls the motor device 200b to adjust the position of the link 300b. It should be noted that, in this embodiment in particular, the number of links, control devices, the motor devices shown in FIG. 2 are only used to illustrate the present invention, and the present invention is not limited thereto.

Each the control device (100a and 100b) in the mechanical arm system 500 includes a first control unit (120a or 120b), a mechanical arm control unit (130a or 130b), driving unit (180a or 180b) and a measurement processing unit (190a or 190b). In this embodiment, the control unit 100a includes a first control unit 120a, a mechanical arm control unit 130a, a driving unit 180a and a measurement processing unit 190a, and the mechanical arm control unit 130a also includes a rigid mechanical unit 140a and a mechanical model unit 160a. The control unit 100b includes a first control unit 120b, a mechanical arm control unit 130b, a driving unit 180b and a measurement processing unit 190b, and the mechanical arm control unit 130b also includes a rigid mechanical unit 140b and a mechanical model unit 160b. The operation method of the mechanical arm system 500 will be described in detail below.

In this embodiment, because the structure and the operation method of the control devices 100a and 100b are the same, the present invention only describes the operation method of the control device 100a and does not repeat the operation method of the control device 100b.

In FIG. 2, the first control unit 120a in the control device 100a receives an end-position command S1a to output a first torque signal τ1. The ordinary person skilled in the art can understand that the first control unit 120a has a speed controller (not shown) and a position controller (not shown) etc. Thus, the first control unit 120a can obtain a target rotatory angle based on the end-position command S1a and compute a target rotatory acceleration and a target rotatory speed by the speed controller and the position controller. As a result, in some embodiments, the first control unit 120a outputs the first torque signal τ1, including the target rotatory angle, the target rotatory speed and the target rotatory acceleration. Because the ordinary person skilled in the art can understand the operation principles of the first control unit 120a, so the present invention does not repeat the illustration.

The rigid mechanical unit 140a in the mechanical arm control unit 130a has a rigid mechanical equation. When the rigid mechanical unit 140a receives the first torque signal τ1 from the first control unit 120a, the rigid mechanical unit 140a operates the rigid mechanical equation to create the rigid mechanical model in accordance with the target rotatory angle, the target rotatory speed and the target rotatory acceleration of the first torque signal τ1. After the rigid mechanical unit 140a completes the rigid mechanical model, the rigid mechanical unit 140a computes the rigid mechanical torque τ2 based on the rigid mechanical model, and the rigid mechanical unit 140a delivers the rigid mechanical torque τ2 to the mechanical model unit 160a in the mechanical arm control unit 130a.

The mechanical model unit 160a receives the rigid mechanical torque τ2 (and/or the rotatory angle and rotatory speed of the other motor device, such as the motor device 200b), and the mechanical model unit 160a operates a model mechanical equation to create a mechanical arm model. After the mechanical model unit 160a completes the mechanical arm model, the mechanical model unit 160a computes a target torque based on the mechanical arm model. Then, the mechanical model unit 160a outputs the target position signal S2 to the driving unit 180a based on the target torque. The driving unit 180a outputs a driving signal S3 to the motor device 200a corresponding the control device 100a for adjusting the rotatory angle of the motor device 200a to change the position of the link 300a corresponding the control device 100a.

When the driving unit 180a adjusts the rotatory angle of the motor device 200a based on the target position signal S2, the measurement processing unit 190a in the control device 100a measures and computes the kinematic parameters of the motor device 200a. The kinematic parameters comprise a rotatory angle $q_1$, a rotatory speed $\dot{q}_1$ and a rotatory acceleration $\ddot{q}_1$. In this embodiment, the measurement processing unit 190a has a speed controller (not shown) and position controller (not shown). Thus, the measurement processing unit 190a measures the rotatory angle $q_1$ of the motor device 200a, and the rotatory speed $\dot{q}_1$ and the rotatory acceleration $\ddot{q}_1$ are measured by using the speed controller and position controller based on the rotatory angle $q_1$. The measurement processing unit 190a delivers the kinematic parameters (the rotatory angle $q_1$, the rotatory speed $\dot{q}_1$ and the rotatory acceleration $\ddot{q}_1$) of the motor device 200a to the rigid mechanical unit 140a. In addition, the measurement processing unit 190a outputs the kinematic parameters (the rotatory angle $q_1$, the rotatory speed $\dot{q}_1$ and the rotatory acceleration $\ddot{q}_1$) to the other control devices in the mechanical arm system 500, such as the rigid mechanical unit 140b in the control device 100b.

Specifically, in this embodiment, because the present invention simply presents the control devices 100a and 100b as examples, the measurement processing unit 190a outputs the rotatory angle $q_1$, the rotatory speed $\dot{q}_1$ and the rotatory speed $\dot{q}_1$ to the rigid mechanical unit 140b in the control device 100b, and the measurement processing unit 190b outputs the rotatory angle $q_2$, the rotatory speed $\dot{q}_2$ and the rotatory acceleration $\ddot{q}_2$ to the rigid mechanical unit 140a in the control device 100a. However, the present invention is not limited thereto. In other embodiments, when the mechanical arm system has multiple control devices (or at least two control device) to control multiple motor devices (or at least two motor devices) to adjust positions of multiple links (or at least two links), the rotatory angle, the rotatory speed and the rotatory acceleration, measured by one of the multiple control devices, can be delivered to the rigid mechanical unit in the other control devices. As a result, the rigid mechanical unit in one of the multiple control devices receives the rotatory angles, the rotatory speeds and the rotatory accelerations measured by the other control devices.

In this embodiment, after the rigid mechanical unit 140a receives the kinematic parameters (the rotatory angle $q_1$, the rotatory speed $\dot{q}_1$ and the rotatory acceleration $\ddot{q}_1$) of the motor device 200a and kinematic parameters (the rotatory angle $q_2$, the rotatory speed $\dot{q}_2$ and the rotatory acceleration $\ddot{q}_2$) of the motor device 200b, the rigid mechanical unit 140a operates the rigid mechanical equation to adjust the rigid mechanical model based on the kinematic parameters of the motor devices 200a and 200b, in order to adjust the rigid mechanical torque τ2 for the mechanical model unit 160a. The mechanical model unit 160a adjusts the mechanical arm model for changing target torque and target position based on the adjusted rigid mechanical torque τ2.

At this time, the mechanical model unit 160a outputs the first feedback signal S4 for the first control unit 120a based on the adjusted target torque. When the first control unit 120a identifies that when the difference of the end-position command S1a and the first feedback signal S4 fails to fall within the first error range, the first control unit 120a adjusts the value of the first torque signal τ1 for the rigid mechanical unit 140a. In some embodiments, the first error range is 0~5%.

The rigid mechanical unit 140a repeatedly operates the rigid mechanical equation to adjust the rigid mechanical model based on the adjusted first torque signal τ1, such that the rigid mechanical torque τ2 is changed. In some embodiments, when the first control unit 120a changes the first torque signal τ1 for the rigid mechanical unit 140a based on the first error range, the rigid mechanical unit 140a operates the rigid mechanical equation to adjust the rigid mechanical torque τ2 based on the target rotatory angle, target rotatory speed and target rotatory acceleration in the adjusted first torque signal τ1.

The mechanical model unit 160a outputs the target position signal S2 to the driving unit 180a for adjusting the rotatory angle of the motor device 200a based on the adjusted rigid mechanical torque τ2. Then, the measurement processing unit 190a measures the kinematic parameters (the rotatory angle $q_1$, the rotatory speed $\dot{q}_1$ and the rotatory acceleration $\ddot{q}_1$) of the motor device 200a and repeats the operation methods mentioned above.

In some embodiments, the rigid mechanical units (140a and 140b) and the mechanical model units (160a and 160b) can be the components having operation functions, such as a central processing unit (CPU), a controller, a processor, or control chip etc., but the present invention is not limited thereto. In other some embodiments, the mechanical arm control units (130a and 130b) can be the components having operation functions, such as a central processing unit (CPU), a controller, a processor, or control chip etc., and the rigid mechanical units (140a and 140b) and the mechanical model units (160a and 160b) can be firmware or software set in the mechanical arm control units (130a and 130b). However, the present invention is not limited thereto.

As a result, in the present invention, the mechanical arm control units (130a and 130b) in the mechanical arm system 500 play a core role. Therefore, the operation principles and methods of the mechanical arm control units (130a and 130b) are described in detail as below.

Figure 3:
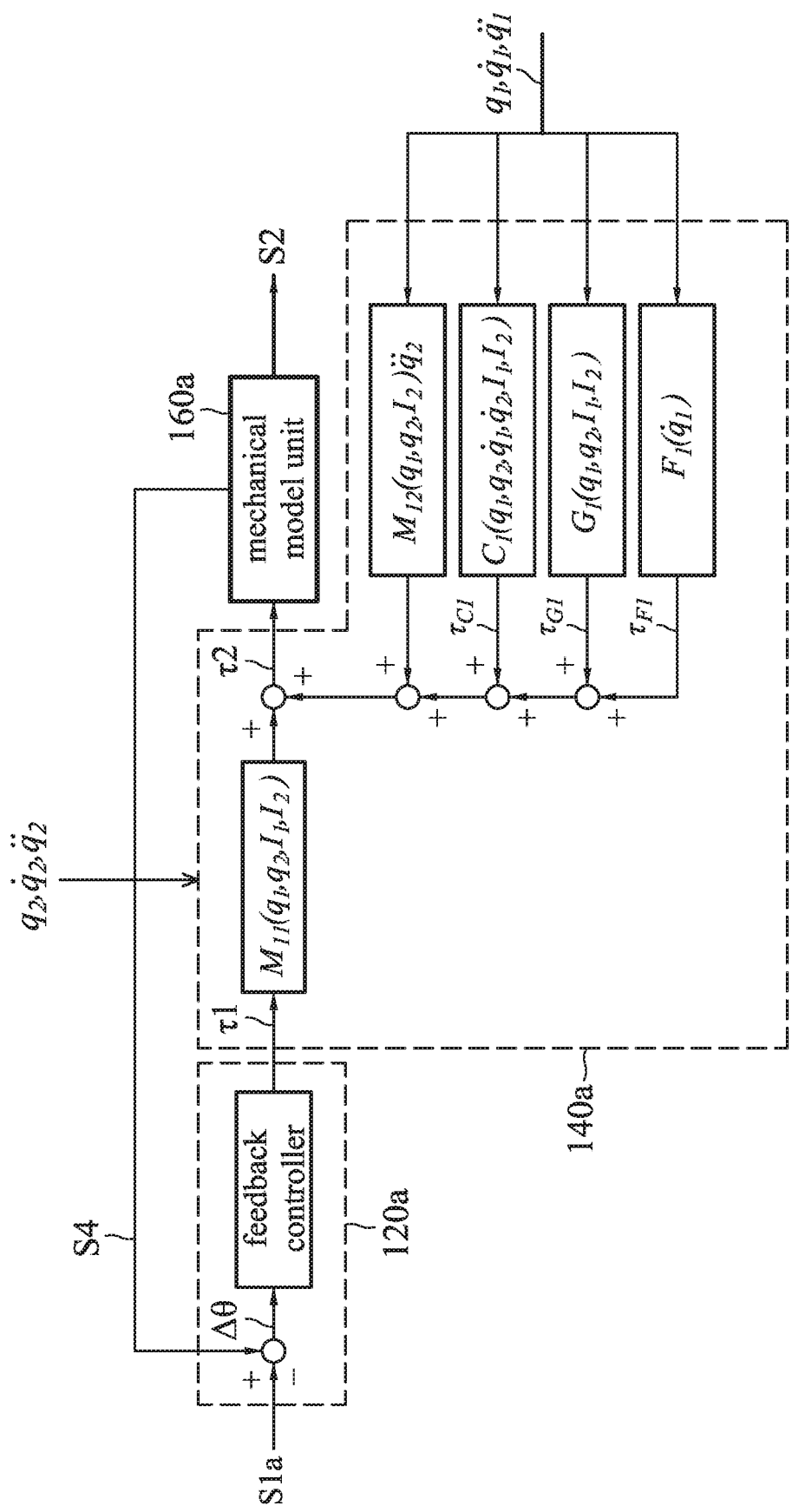
FIG. 3 is a block diagram of a mechanical arm control unit in a mechanical arm system in accordance with one embodiment of the present invention.

FIG. 3 is a block diagram of a mechanical arm control unit in a mechanical arm system in accordance with one embodiment of the present invention. In the present invention, because the mechanical arm control units (130a and 130b) have identical operation principles and methods, the present invention simply illustrates the operation of the mechanical arm control unit 130a, and the operation of the mechanical arm control unit 130b is not described repeatedly in the present invention. Please refer to FIG. 2 and FIG. 3 for illustrating the embodiments of the present invention.

In the mechanical arm control unit 130a, when the rigid mechanical unit 140a receives the first torque signal $\tau 1$ from the first control unit 120a, the rigid mechanical unit 140a operates a rigid mechanical equation to create the rigid mechanical model based on the target rotatory angle, the target rotatory speed and the target rotatory acceleration of the first torque signal $\tau 1$. The rigid mechanical equation is shown in equation (1) below:

$$\text{mechanical axis torque of rigid arm} = M(q)\ddot{q}_{n\times 1} + C(q, \dot{q})_{n\times 1} + G(q)_{n\times 1} + F(\dot{q})_{n\times 1} \quad (1)$$

In the equation (1), each of M, C, G and F is matrix. The matrix $M(q)_{n\times n}$ includes the element: the rotatory angle (q), and the matrix $M(q)_{n\times n}$ is a matrix with h n rows and n columns, and the result of multiplying the matrix $M(q)_{n\times n}$ by the rotatory acceleration ($\ddot{q}$) can represent the inertial force of the link. The matrix $C(q, \dot{q})_{n\times 1}$ includes the following elements: the rotatory angle (q) and the rotatory speed ($\dot{q}$). The matrix $C(q, \dot{q})_{n\times 1}$ is a matrix with n rows and one column, and matrix $C(q, \dot{q})_{n\times 1}$ can represent the Coriolis force (or centripetal force) of the link. The matrix $G(q)_{n\times 1}$ includes the following elements: the rotatory angle (q). The matrix $G(q)_{n\times 1}$ is a matrix with n rows and one column, and matrix $G(q)_{n\times 1}$ can represent the gravity of the link. The matrix $F(\dot{q})_{n\times 1}$ includes the following elements: the rotatory speed ($\dot{q}$). The matrix $F(\dot{q})_{n\times 1}$ is a matrix with n rows and one column, and matrix $F(\dot{q})_{n\times 1}$ can represent the kinetic friction force of the link. Then, as described earlier, the rigid mechanical unit 140a adds the inertial force of the link, the Coriolis force (or centripetal force) of the link, the gravity of the link, and the kinetic friction force of the link to establish a rigid mechanical model. The rigid mechanical unit 140a adds the inertia force of the link, the Coriolis force (or centripetal force) of the link, the gravity of the link, and the kinetic friction force of the link to obtain a sum, and the sum is considered as the value of the rigid mechanical torque. In some embodiments, the traditional mechanical arm system can obtain the transformation matrix by the Denavit-Hartenberg parameter method. Then, after differentiating the transformation matrix, the Euler-Lagrange equation is derived to obtain the matrices M, C, G, and F in the equation (1). In some embodiments, a plurality of the dynamic parameters of the motor device includes inertial force (matrix M), Coriolis standing and centripetal force (matrix C), gravity (matrix G), and kinetic friction force (matrix F), but the present invention is not limited thereto. Since a person skilled in the art can obtain the matrices M, C, G, and F in the equation (1) through the method described above, the present invention will not repeat the description.

In FIG. 3, the rigid mechanical unit 140a initially substitutes the target rotatory angle, the target rotatory speed, and the target rotatory acceleration of the first torque signal $\tau 1$ into the rigid mechanical equation (shown as equation (1)) to obtain the rigid mechanical model for obtaining the rigid mechanical torque $\tau 2$.

In some embodiments, when the rigid mechanical unit 140a initially receives the first torque signal $\tau 1$, the measurement processing unit 190a has not yet output the kinematic parameters (the rotatory angle $q_1$, the rotatory speed $\dot{q}_1$ and the rotatory acceleration $\ddot{q}_1$) of the motor device 200a, and the measurement processing unit 190b has not yet output the kinematic parameters (the rotatory angle $q_2$, the rotatory speed $\dot{q}_2$ and the rotatory acceleration $\ddot{q}_2$) of the motor device 200b. At this time, the mechanical unit 140a obtains matrices M, C, G, and F based on the rigid mechanical equation (shown in equation (1)) and the first torque signal $\tau 1$, including the target rotatory angle, the target rotatory speed and the target rotatory acceleration. The mechanical unit 140a uses the matrices M, C, G, and F to define or create the rigid mechanical model for obtaining the rigid mechanical torque $\tau 2$. As a result, when the rigid mechanical unit 140a initially receives the first torque signal, the parameters $q_1$, $\dot{q}_1$ and $\ddot{q}_1$ are the target rotatory angle, the target rotatory speed and the target rotatory acceleration of the first torque signal $\tau 1$ respectively. The parameters $q_2$, $\dot{q}_2$ and $\ddot{q}_2$ are zero. In other some embodiments, because the offset between the position of the motor device 200b and the starting position, the initial rotatory angle $q_2$ of the motor device 200b is not zero.

The mechanical model unit 160a receives the rigid mechanical torque $\tau 2$ to output a target position signal S2 to the driving unit 180a, so that the motor devices 200a and 200b start to rotate. When the motor devices 200a and 200b start to rotate, the measurement processing devices 190a and 190b start to output the kinematic parameters of the motor devices 200a and 200b.

Because the mechanical arm system 500 of the present invention has at least two links (for example, 300a and 300b), the mechanical arm control unit 130a needs to calculate the kinematic parameters of the motor device 200b (the rotatory angle $q_2$, the rotatory speed $\dot{q}_2$ and the rotatory acceleration $\ddot{q}_2$), except for calculating the kinematic parameters of the motor device 200a. As a result, in the equation (1), the kinematic parameters of the motor device 200a and the motor device 200b need to be added to the matrices M, C, G, and F.

As a result, in FIG. 3, the matrix $M_{11}(q_1, q_2, I_1, I_2)$ represents the first inertial force of the motor device 200a, and $I_1$ and $I_2$ are the moment of inertia of the motor device 200a and the moment of inertia of the motor device 200b, and $q_1$ and $q_2$ are the rotatory angle of the motor device 200a and the rotatory angle of the motor device 200b. The matrix $M_{12}(q_1, q_2, I_2)\ddot{q}_2$ represents the second inertial force, which the motor device 200a corresponds to the motor device 200b. $\ddot{q}_2$ is the rotatory speed $\dot{q}_2$ of the motor device 200b. The matrix $C_1(q_1, q_2, \dot{q}_1, \dot{q}_2, I_1, I_2)$ represents the Coriolis force (or centripetal force) of the motor device 200a. The matrix $G_1(q_1, q_2, I_1, I_2)$ represents the gravity of the link 300a that the motor device 200a is subjected to. The matrix $F_1(\dot{q}_1)$ is represented by the kinetic friction force of the motor device 200a.

In this embodiment, the moment of inertia $I_1$ of the motor device 200a and the moment of inertia $I_2$ of the motor device 200b are the moments of inertia (or inertia moment) of the motor device 200a and the motor device 200b, respectively. A person skilled in the art can understand that the moment of inertias $I_1$ and $I_2$ of the motor device can be calculated based on the mass of the link, the position of the centroid of the link, mass of the motor device and position of rotating shaft of the motor device. Because the mass of the link, the position of the centroid of the link, mass of the motor device and position of rotating shaft of the motor device are fixed value, the moment of inertias $I_1$ and $I_2$ are fixed value. In this embodiment, the values of the moment of inertias $I_1$ and $I_2$ can be directly set in the rigid mechanical equations (shown as equation (1)) in the rigid mechanical unit 140a.

Then, according to the equation (1), the rigid mechanical unit 140a combines (or adds up) the first inertial force (matrix $M_{11}*\ddot{q}_1$), the second inertial force (matrix $M_{12}*\ddot{q}_2$), Coriolis and Centripetal force (matrix $C_1$), gravity (matrix $G_1$) and kinetic friction force (matrix $F_1$) with each other to build a rigid mechanical model and obtain a sum, that is taken as the rigid mechanical torque $\tau 2$. The rigid mechanical unit 140a transmits the rigid mechanical torque $\tau 2$ to the mechanical model unit 160a.

In some embodiments, the mechanical model unit 160a includes a flexible mechanical model and a mechanical arm model. The method for establishing the flexible mechanical model and the mechanical arm model by the mechanical model unit 160a is described in detail below. In the mechanical model unit 160a, when the mechanical model unit 160a receives the rigid mechanical torque $\tau 2$ from the rigid mechanical unit 140a, the mechanical model unit 160a obtains the flexible mechanical torque through the flexible mechanical equation. The flexible mechanical equation is shown in the following equation (2):

$$\text{mechanical axis torque due to flexible phenomenon} = D_{n \times n}(\dot{\xi})_{n \times 1} + K_{n \times n}(\xi)_{n \times 1} \quad (2)$$

A person skilled in the art may refer to the Citation 1 (C. Sun, W. He, and J. Hong, "Neural Network Control of a Flexible Robotic Manipulator Using the Lumped Spring-Mass Model," IEEE Transactions on Systems, Man, and Cybernetics), and perform calculations to obtain the equation (2).

In the equation (2), $\xi$ represents the offset angle of the end position of the links (300a or 300b), and $\dot{\xi}$ represents the offset speed of the end position of the links (300a or 300b). $D_{n \times n}(\dot{\xi})$ is the damping force, and $K_{n \times n}(\xi)$ is the spring force. The mechanical model unit 160a calculates a flexible mechanical torque according to a flexible mechanical equation (equation (2)), and establishes a flexible mechanical model according to the flexible mechanical equation. After the flexible mechanical model is established, the mechanical model unit 160a adds rigid mechanical equations (equation (1)) and flexible mechanical equations (equation (2)) to establish a mechanical arm model, and the mechanical model unit 160a uses the sum of the rigid mechanical torque and the flexible mechanical torque described above as the target torque. The target torque is shown in equation (3):

$$\text{target torque} = M(q)\ddot{q}_{n \times 1} + C(q, \dot{q})_{n \times 1} + \quad (3)$$
$$G(q)_{n \times 1} + F(\dot{q})_{n \times 1} + D_{n \times n}(\dot{\xi})_{n \times 1} + K_{n \times n}(\xi)_{n \times 1}$$

In this embodiment, the mechanical model unit 160a may establish a mechanical arm model according to the equation (3). Then, the mechanical model unit 160a can shift and integrate the equation (3), so that the equation (4) can be obtained as follows:

$$\ddot{q}_{n \times 1} = M(q)^{-1}[\tau - C(q, \dot{q}) - G(q) - F(\dot{q}) - D(\dot{\xi}) - K(\xi)] \quad (4)$$

Then, the equation (5) can be obtained by integrating the equation (4), and the equation (6) can be obtained by integrating the equation (5).

$$\dot{q}_{n \times 1} = \int \ddot{q}_{n \times 1} dt \quad (5)$$

$$q_{n \times 1} = \int \dot{q}_{n \times 1} dt \quad (6)$$

When the rigid mechanical unit 140a outputs the rigid mechanical torque $\tau 2$ according to the first torque signal $\tau 1$, the mechanical model unit 160a can obtain the target position from the target torque through equation (6), and outputs the target position signal S2 to the driving unit 180a.

In addition, by the equations (3)~(6), the mechanical arm control unit 130a calculates the position of the link 300a (or the rotatory angle of the motor device 200a) according to the kinematic parameters of the motor devices 200a and 200b. Then, the mechanical model unit 160a outputs the first feedback signal S4 to the first control unit 120a according to the position of the link 300a (or the rotatory angle of the motor device 200a). As a result, after receiving the kinematic parameters of the motor devices 200a and 200b, the rigid mechanical unit 140a runs equation (1) and outputs the rigid mechanical torque $\tau 2$ to the mechanical model unit 160a. After receiving the rigid mechanical torque $\tau 2$, the mechanical model unit 160a runs the equations (3) to (6) to obtain the position of the link 300a (or the rotatory angle of the motor device 200a). Then, the mechanical model unit 160a outputs a first feedback signal S4 to the first control unit 120a according to the position of the link 300a.

When the first control unit 120a determines that the difference between the end-position command S1a and the first feedback signal S4 does not fall within the first error range $\Delta \theta$, the first control unit 120a adjusts the value of the first torque signal $\tau 1$ to the rigid mechanical unit 140a. At this time, the rigid mechanical unit 140a repeatedly performs the operation method mentioned above.

Figure 4:
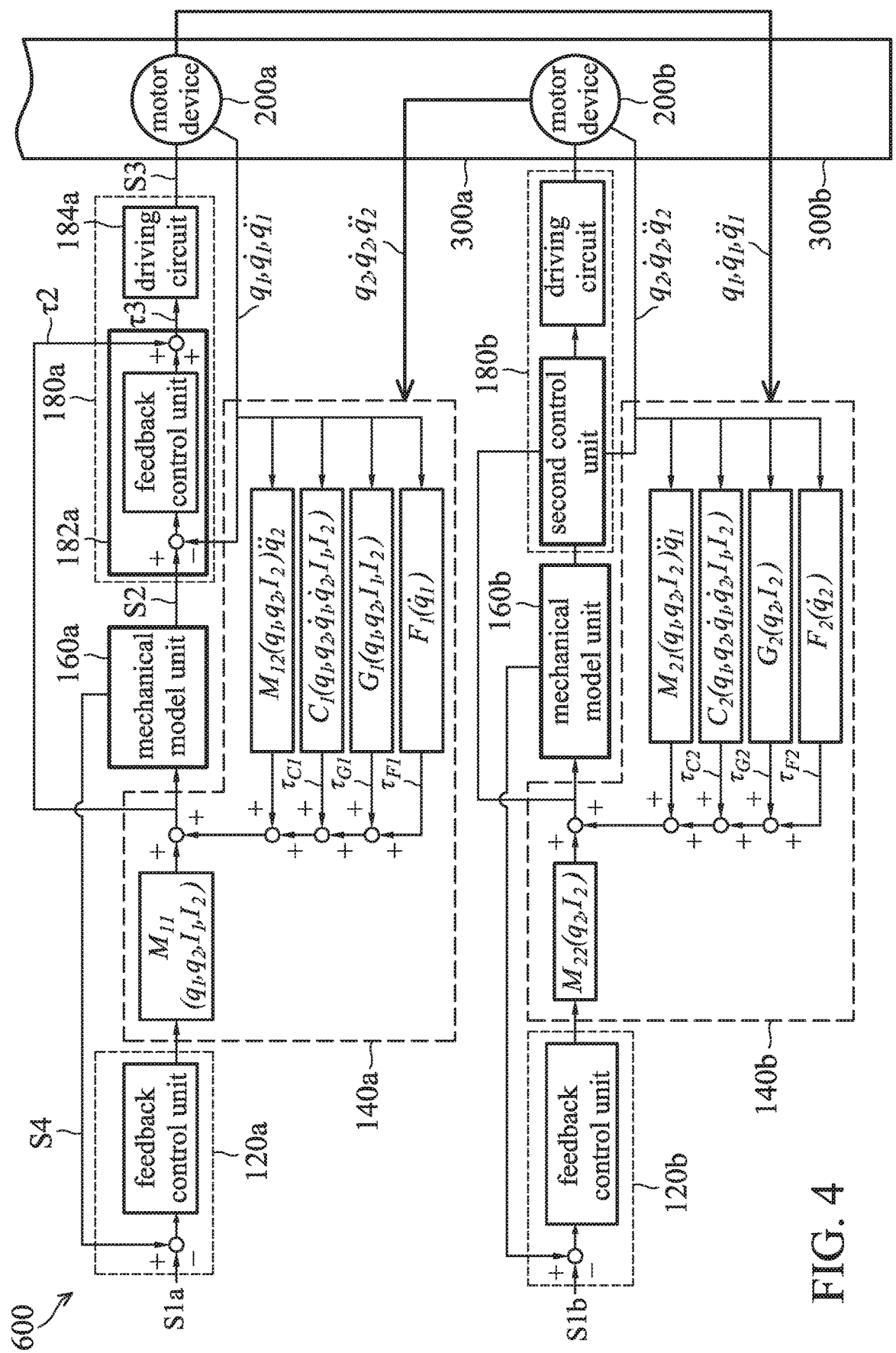
FIG. 4 is a block diagram of a mechanical arm system in accordance with another one embodiment of the present invention.

FIG. 4 is a block diagram of a mechanical arm system 600 in accordance with another one embodiment of the present invention. Because the measurement processing units 190a and 190b are respectively provided in the motor devices 200a and 200b, both the measurement processing units 190a and 190b are not shown in FIG. 4. Furthermore, in FIG. 4, the motor device 200b is configured to control the link 300b of the mechanical arm system 600, and the link 300b is located at the end position of the mechanical arm system 600. In practical applications, since the link 300b is located at the end position of the mechanical arm system 600, the link 300b will be equipped with an end effector, such as a mechanical gripper. In this embodiment, the operation principles and methods of the first control unit (120a and 120b), the rigid mechanical unit 140a, and the mechanical model unit (160a and 160b) have been described in detail above, so they will not be repeated here.

In this embodiment, because the motor device 200b is used to control the link 300b at the end position of the mechanical arm system 600, the control of the motor device 200b can partially ignore the kinematic parameters of the motor device 200a and the link 300a. Therefore, part of the matrix in the rigid mechanical equation in the rigid mechanical unit 140b is different from the rigid mechanical unit 140a.

As described above, the first inertial force (matrix $M_{22}$) and gravity (matrix $G_2$) in the rigid mechanical unit 140b may not be affected by the link 300a. Therefore, as shown in FIG. 4, the matrix $M_{22}$ has the following parameters: the rotatory angle $q_2$ of the motor device 200b and the moment of inertia $I_2$ of the motor device 200b. The matrix $G_2$ has the following parameters: the rotatory angle $q_2$ of the motor device 200b and the moment of inertia $I_2$ of the motor device 200b.

In addition, in the rigid mechanical unit 140b, the matrix $M_{21}(q_1, q_2, I_2)\ddot{q}_1$ represents the second inertial force of the link 300b corresponding to the link 300a, where $\ddot{q}_1$ is the rotatory acceleration of the motor device 200a.

In this embodiment, the parameters of the Coriolis force (matrix C1 and C2) in the rigid mechanical unit 140a and the rigid mechanical unit 140b are the same, including the rotatory angle $q_1$, rotatory speed $\dot{q}_1$, rotatory angle $\dot{q}_2$, rotatory speed $\dot{q}_2$, the moment of inertia $I_1$ of the motor device 200a (representing the moment of inertia of the link 300a) and moment of inertia $I_2$ of the motor device 200b (representing the moment of inertia of the link 300b). The matrix $F_1(\dot{q}_2)$ represents the kinetic friction force of the link 300a, and $q_2$ in the matrix $F_1(\ddot{q}_2)$ is the rotatory speed of the motor device 200b.

In this embodiment, the driving units 180a and 180b also have a feedback control system. Because the control methods of the driving units 180a and 180b are the same, the present invention simply describes the operation method of the driving unit 180a.

The driving unit 180a includes a second control unit 182a and a driving circuit 184a. The second control unit 182a is coupled to the target position signal S2 and the rigid mechanical torque τ2 to output a second torque signal τ3 to the driving circuit 184a. The driving circuit 184a outputs a driving signal S3 according to the second torque signal τ3.

When the second control unit 182a determines that the difference between the target position signal S2 and the rotatory angle $q_1$ of the motor device 200a does not fall within the second error range, the second control unit 182a adjusts the value of the second torque signal τ3. In some embodiments, the second error range is between 0 and 5%.

Figure 5:
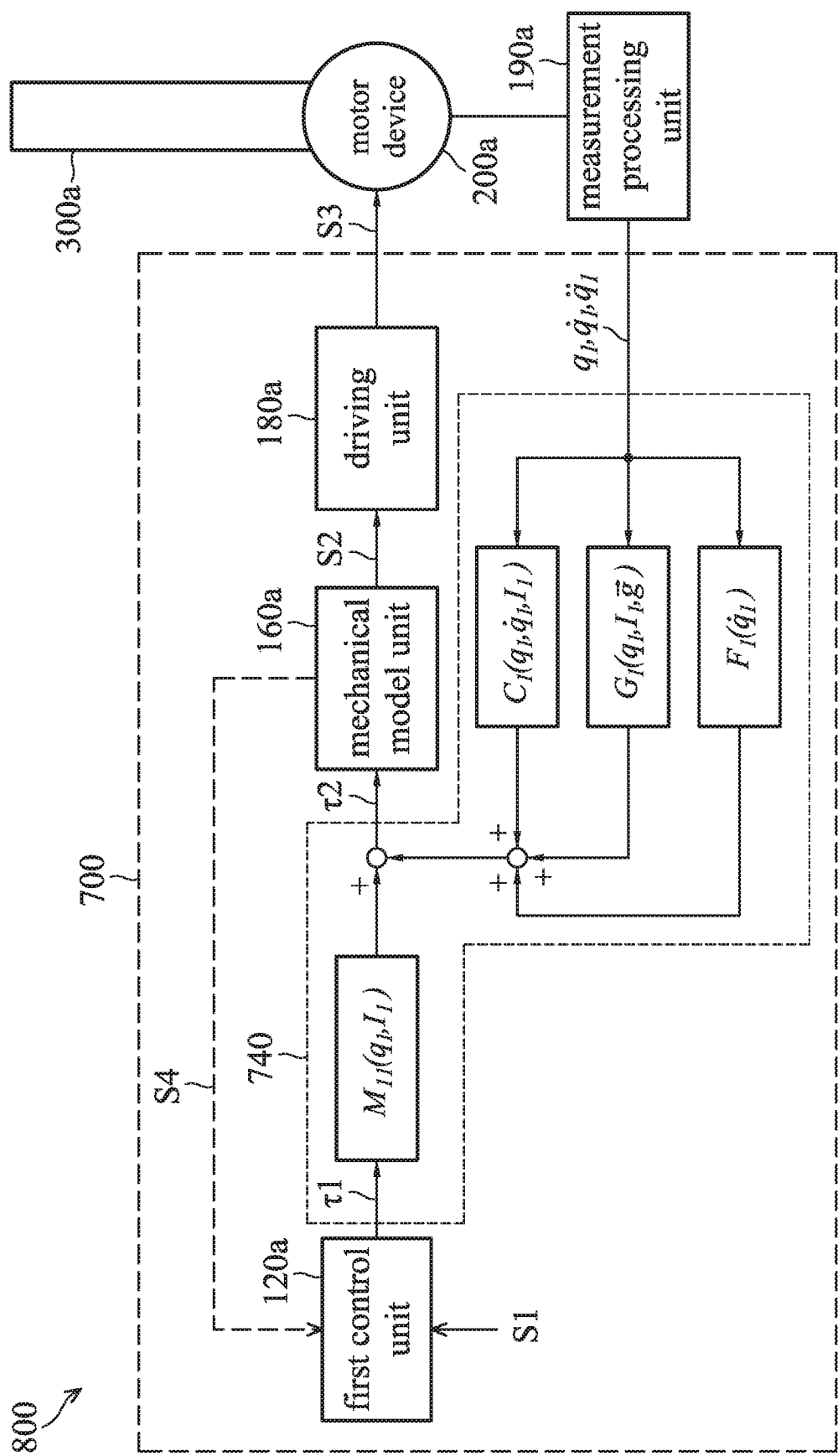
FIG. 5 is a block diagram of a mechanical arm system in accordance with another one embodiment of the present invention.

FIG. 5 is a block diagram of a mechanical arm system 800 in accordance with another one embodiment of the present invention. In this embodiment, the mechanical arm system 800 includes a single link 300a, a motor device 200a coupled to the link 300a, and a control device 700 coupled to the motor device 200a. In this embodiment, the structure and operation method of the control device 700 are the same as the control devices 100a and 100b shown in FIG. 2, so the present invention does not repeatedly illustrate the control device 700. In various embodiments, the measurement processing unit 190a may be provided in the control device 700 or outside the control device 700, but the present invention is not limited thereto.

In addition, similar to the control device 100a shown in FIG. 3, the rigid mechanical unit 740 in the control device 700 also has a rigid mechanical equation. However, because the mechanical arm system 700 has only a single link, it is not necessary to consider the motion states of other links. Therefore, the rigid mechanical equation in the rigid mechanical unit 740 does not have the second inertial force. Since the rigid mechanical equation in the rigid mechanical unit 740 does not need to consider the motion states of other links, the kinematic parameters of other motor devices can also be ignored.

In this embodiment, the first control unit 120a outputs a first torque signal τ1 according to the end-position command S1. At the beginning, the rigid mechanical unit 740 receives the first torque signal τ1 output by the first control unit 120a to output the rigid mechanical torque τ2. The mechanical model unit 160a receives the rigid mechanical torque τ2 to output a target position signal S2 to the driving unit 180a.

The driving unit 180a adjusts the rotatory angle of the motor device 200a according to the target position signal S2.

The measurement processing unit 190a measures the kinematic parameters (the rotatory angle $q_1$, the rotatory speed $\dot{q}_1$ and the rotatory acceleration $\ddot{q}_1$) of the motor device 200a, and transmits the kinematic parameters to the rigid mechanical unit 740. At this time, the rigid mechanical unit 740 adjusts the rigid mechanical torque τ2 to the mechanical model unit 160a according to the kinematic parameters (the rotatory angle $q_1$, the rotatory speed $\dot{q}_1$ and the rotatory acceleration $\ddot{q}_1$) of the motor device 200a. The mechanical model unit 160a changes the target position signal S2 to the drive unit 180a according to the adjusted rigid mechanical torque τ2.

In other embodiments, the mechanical model unit 160a outputs a first feedback signal S4 to the first control unit 120a according to the adjusted rigid mechanical torque τ2. Next, the operation method of the first control unit 120a has been described in detail in FIGS. 2 to 4, so it will not be described again.

Figure 6:
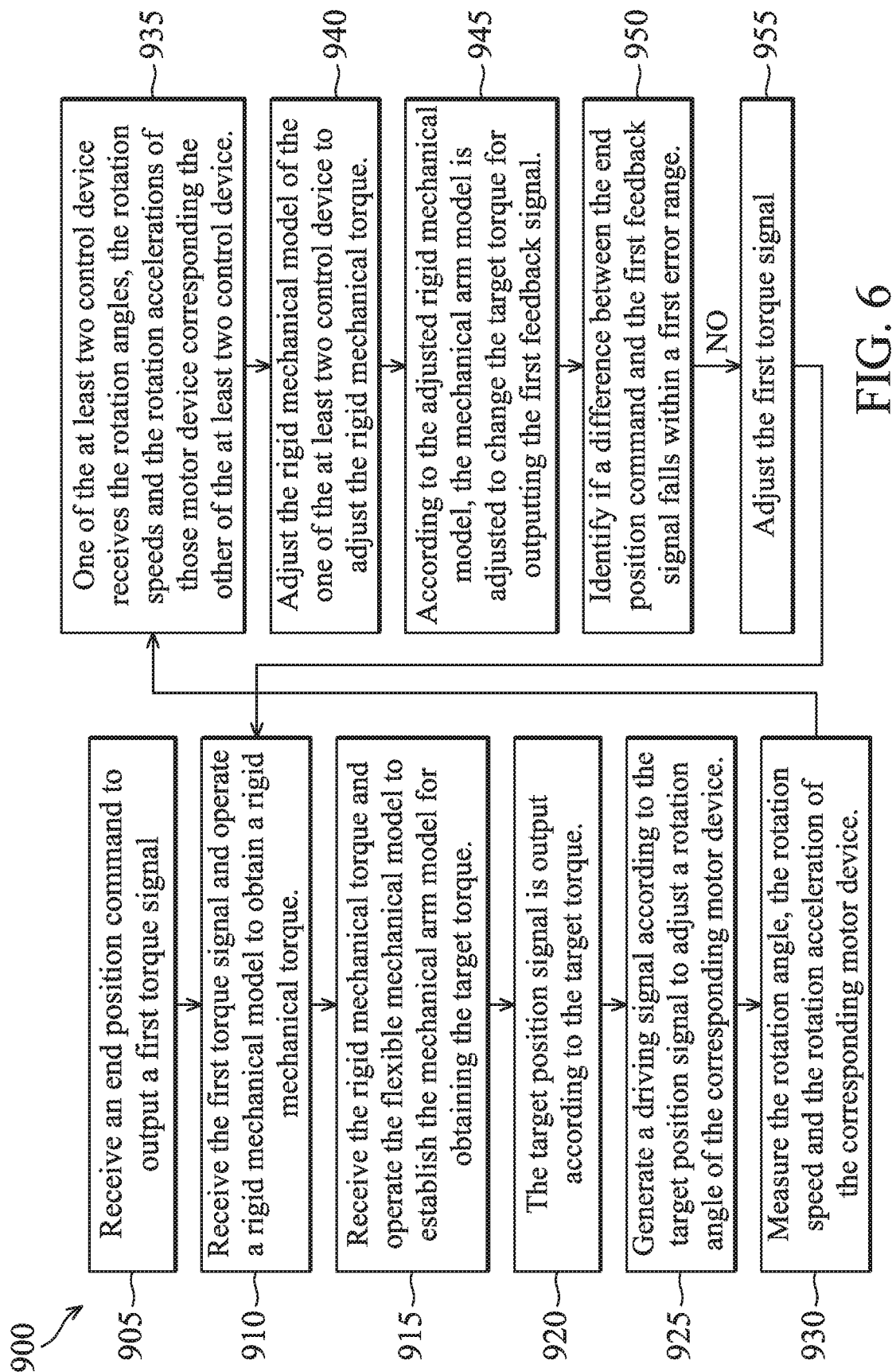
FIG. 6 is a flow chart for a control method of a mechanical arm system in accordance with one embodiment of the present invention.

FIG. 6 is a flow chart for a control method 900 of a mechanical arm system 500 in accordance with one embodiment of the present invention. Please refer to FIG. 2 and FIG. 6 together to explain the following embodiments. In FIG. 6, the control method 900 may be executed by the control devices 100a and 100b of the mechanical system 500 shown in FIG. 2, respectively. In this embodiment, because the operation control method 900 of the control device 100a and 100b is the same, the present invention simply describes the operation control method 900 of the control device 100a.

In FIG. 6, the control device 100a starts from step 905. The first control unit 120a in the control device 100a receives the end-position command signal S1a and outputs a first torque signal τ1. In this embodiment, the first torque signal τ1 includes a target rotatory angle, a target rotatory speed, and a target rotatory acceleration. Then, the control device 100a continues to perform step 910.

In step 910, the rigid mechanical unit 140a in the control device 100a receives the target rotatory angle, the target rotatory speed, and the target rotatory acceleration in the first torque signal, and the rigid mechanical unit 140a runs a rigid mechanical equation (equation (1)) to establish a rigid mechanical model. After the establishment of the rigid mechanical model is completed, the rigid mechanical unit 140a runs the rigid mechanical model to obtain a sum that is considered as the rigid mechanical torque τ2. Then, the control device 100a proceeds to step 915.

In step 915, the mechanical model unit 160a in the control device 100a receives the rigid mechanical torque τ2. At the same time, the mechanical model unit 160a performs the flexible mechanical equation (equation (2)) to establish the flexible mechanical model to obtain the flexible mechanical torque. The mechanical model unit 160a adds the rigid mechanical torque τ2 and the flexible mechanical torque to obtain the equation (3), and establishes the mechanical arm model through the equation (3). The mechanical model unit 160a obtains the target torque through the mechanical arm model. Then, the mechanical model unit 160a proceeds to step 920.

In step 920, the mechanical model unit 160a outputs a target position signal S2 to the drive unit 180a according to the target torque. In step 925, the driving unit 180a generates the driving signal S3 to the motor device 200a according to the target position signal S2 to adjust the rotatory angle of the motor device 200a. Then, the control device 100a proceeds to step 930.

In step 930, the measurement processing unit 190a in the control device 100a measures the rotary angle $q_1$ of the motor device 200a, and calculates the rotary speed $\dot{q}_1$ and the rotary acceleration $\ddot{q}_1$ of the motor device 200a. The measurement processing unit 190a delivers the kinematic parameters (the rotary angle $q_1$, the rotary speed $\dot{q}_1$ and the rotary acceleration $\ddot{q}_1$) of the motor device 200a to the rigid mechanical unit 140a.

In step 935, one of the at least two control devices (for example, the control device 100a) receives the rotary angle, rotary speed, and rotary acceleration of the motor devices corresponding to the other of the at least two control devices (for example, the control device 100b). For example, in motor device 200b, these may be rotary angle $q_2$, rotary speed $\dot{q}_2$ and rotary acceleration $\ddot{q}_2$ of the motor device 200b (hereinafter referred to as the kinematic parameters of the motor device 200b).

In step 940, the rigid mechanical model of one of the at least two control devices (control device 100a) is adjusted to change the rigid mechanical torque. The rigid mechanical unit 140a in the control device 100a receives the kinematic parameters of the motor device 200a and the motor device 200b, and the rigid mechanical unit 140a operates the rigid mechanical equation (equation (1)) to adjust the rigid mechanical model. The rigid mechanical unit 140a then changes the value of the rigid mechanical torque τ2 to the mechanical model unit 160a according to the adjusted rigid mechanical model.

In step 945, the mechanical model unit 160a receives the changed rigid mechanical torque τ2 and operates equation (3) to adjust the mechanical arm model and changes the target torque. The mechanical model unit 160a, by means of the equation (6), estimates the position of the link 300a to output a first feedback signal S4 to the first control unit 120a, based on the changed target torque.

In step 950, the first control unit 120a determines whether the difference between the end-position command S1a and the first feedback signal S4 falls within the first error range. If the difference does not fall within the first error range, the first control unit 120a adjusts the first torque signal S1 to the rigid mechanical unit 140a, and the control device 100a repeats the next steps 915 to 950 starting from step 910.

In step 950, if the difference falls within the first error range, the first control unit 120a maintains the fixed first torque signal S1 to the rigid mechanical unit 140a. In order to simplify FIG. 6, the present invention does not show this step in FIG. 6.

In conclusion, the mechanical arm system of the present invention completes the operation of the mechanical arm system through control devices (such as the control devices 100a and 100b) corresponding to each of the links, instead of using the central controller in the mechanical arm system. In this way, the central controller (not shown) in the mechanical arm system only needs to complete the signal transmission function. For example, the central controller transmits the kinematic parameters of the motor device, measured by the control device, to the rigid mechanical unit in the other control device. The central controller still has additional computation ability so that the central controller can be used for more other applications, such as: cloud computing, image processing, network connection, etc. Therefore, the mechanical arm system of the present invention can be applied to a wider application and can be more flexibly designed.

In addition, because the present invention makes full use of the processors of each link (such as the control devices 100a and 100b), the present invention also solves the problem of waste of hardware resources and so on, and the present invention achieves significant advantages, such as cost reduction.

While the invention has been described above in terms of a preferred embodiment, it is not intended to limit the scope of the invention, and it should be understood by those of ordinary skill in the art without departing from the spirit and scope of the invention. Instead, the scope of the invention should be determined by the scope of the appended claims.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

What is claimed is:

1. A mechanical arm system, comprising at least two links, at least two control devices and at least two motor devices, wherein the at least two control devices respectively control the at least two motor devices to respectively adjust positions of the at least two links, wherein each of the at least two control devices comprises:
   a first control unit, configured to receive an end-position command to output a first torque signal;
   a mechanical arm control unit, comprising a rigid mechanical model and a flexible mechanical model, wherein the mechanical arm control unit receives the first torque signal to obtain a rigid mechanical torque through the rigid mechanical model; creates a mechanical arm model based on the rigid mechanical torque and the flexible mechanical model to obtain a target torque; and outputs a target position signal based on the target torque;
   a driving unit, configured to generate a driving signal to adjust a rotary angle of the corresponding motor device based on the target position signal; and
   a measurement processing unit, configured to measure the rotary angle, a rotary speed and a rotary acceleration of the corresponding motor device;
   wherein the mechanical arm control unit of one of the at least two control devices receives rotary angle, rotary speed and rotary acceleration of the corresponding motor devices of the other at least two control devices for adjusting the rigid mechanical model to change the rigid mechanical torque.

2. The mechanical arm system of claim 1, wherein the mechanical arm control unit adjusts the mechanical arm model to change the target torque based on the adjusted rigid mechanical model and outputs a first feedback signal to the first control unit; wherein when the first control unit identifies that a difference between the end-position command and the first feedback signal falls outside of a first error range, the first control unit adjusts the first torque signal.

3. The mechanical arm system of claim 1, wherein the mechanical arm control unit operates a rigid mechanical equation for computing and adding a plurality of dynamic parameters of the corresponding motor device and obtains a sum of the plurality of dynamic parameters, wherein the mechanical arm control unit uses the sum as the rigid mechanical torque.

4. The mechanical arm system of claim 3, wherein the mechanical arm control unit receives the rotary angle of the motor device corresponding to one of the at least two control devices and the rotatory angles of the motor devices corresponding to the other of the at least two control devices, and the mechanical arm control unit obtains a first inertial force of the plurality of dynamic parameters by operating the rigid mechanical equation.

5. The mechanical arm system of claim 4, wherein the mechanical arm control unit receives the rotatory angle of the motor device corresponding to one of the at least two control devices and the rotatory angles and the rotatory accelerations of the motor devices corresponding to the other of the at least two control devices, and the mechanical arm control unit obtains a second inertial force of the plurality of dynamic parameters by operating the rigid mechanical equation.

6. The mechanical arm system of claim 5, wherein the mechanical arm control unit receives the rotatory angle of the motor device corresponding to one of the at least two control devices and the rotatory angles of the motor devices corresponding to the other of the at least two control devices, and the mechanical arm control unit obtains a gravity of the plurality of dynamic parameters by operating the rigid mechanical equation.

7. The mechanical arm system of claim 3, wherein the mechanical arm control unit receives the rotatory angle of the motor device corresponding to one of the at least two control devices, and the mechanical arm control unit obtains a first inertial force of the plurality of dynamic parameters by operating the rigid mechanical equation.

8. The mechanical arm system of claim 7, wherein the mechanical arm control unit receives the rotatory angle of the motor device corresponding to one of the at least two control devices and the rotatory angles and the rotatory accelerations of the motor devices corresponding to the other of the at least two control devices, and the mechanical arm control unit obtains a second inertial force of the plurality of the dynamic parameters by operating the rigid mechanical equation.

9. The mechanical arm system of claim 8, wherein the mechanical arm control unit receives the rotatory angle of the motor device corresponding to one of the at least two control devices, and the mechanical arm control unit obtains a gravity of the plurality of dynamic parameters by operating the rigid mechanical equation.

10. The mechanical arm system of claim 3, wherein the mechanical arm control unit receives the rotatory angle and the rotatory speed of the motor device corresponding to one of the at least two control devices, and the rotatory angles and the rotatory speeds of the motor devices corresponding to the other of the at least two control devices, and the mechanical arm control unit obtains a Coriolis force (or centripetal force) of the plurality of dynamic parameters by operating the rigid mechanical equation.

11. The mechanical arm system of claim 3, wherein the mechanical arm control unit receives the rotatory speed of the motor device corresponding to one of the at least two control devices, and the mechanical arm control unit obtains a kinetic friction force of the plurality of dynamic parameters by operating the rigid mechanical equation.

12. The mechanical arm system of claim 2, wherein the driving unit comprises a second control unit and a driving circuit, wherein the second control unit is coupled to the rigid mechanical torque and the target position signal to output a second torque signal for the driving circuit to output the driving signal.

13. The mechanical arm system of claim 12, when the second control unit identifies that a difference between the target position signal and rotatory angle of the motor device falls outside of a second error range, the second control unit adjusts the second torque signal.

14. A mechanical arm system, comprising a link, a motor device coupled to the link, and a control device coupled to the motor device, wherein the control device comprises:
a first control unit, configured to receive an end-position command to output a first torque signal;
a mechanical arm control unit, comprising a rigid mechanical model and a flexible mechanical model, wherein the mechanical arm control unit receives the first torque signal to obtain a rigid mechanical torque through the rigid mechanical model, and the mechanical arm control unit creates a mechanical arm model to obtain a target torque based on the rigid mechanical torque and the flexible mechanical model, and the mechanical arm control unit outputs a target position signal based on the target torque;
a driving unit, configured to generate a driving signal based on the target position signal to adjust a rotatory angle of the motor device; and
a measurement processing unit, configured to measure the motor device to output kinematic parameters of the motor device, wherein the kinematic parameters comprise the rotatory angle, a rotatory speed and a rotatory acceleration;
wherein the mechanical arm control unit receives the kinematic parameters of the motor device to adjust the rigid mechanical model to change the rigid mechanical torque.

15. The mechanical arm system of claim 14, wherein the mechanical arm control unit adjusts the mechanical arm model to change the target torque based on the adjusted rigid mechanical model and outputs a first feedback signal to the first control unit; wherein when the first control unit identifies that a difference between the end-position command and the first feedback signal falls outside of a first error range, the first control unit adjusts the first torque signal.

16. The mechanical arm system of claim 14, wherein the mechanical arm control unit operates a rigid mechanical equation for computing and adding a plurality of dynamic parameters of the corresponding motor device and obtains a sum of the plurality of dynamic parameters, wherein the mechanical arm control unit uses the sum as the rigid mechanical torque.

17. The mechanical arm system of claim 16, wherein the mechanical arm control unit receives the rotatory angle of the motor device and operates the rigid mechanical equation to obtain an inertial force of the plurality of dynamic parameters.

18. The mechanical arm system of claim 17, wherein the mechanical arm control unit receives the rotatory angle of the motor device and operates the rigid mechanical equation to obtain a gravity of the plurality of dynamic parameters;
the mechanical arm control unit receives the rotatory angle and the rotatory speed of the motor device and operates the rigid mechanical equation to obtain a Coriolis force of the plurality of dynamic parameters; and
the mechanical arm control unit receives the rotatory speed of the motor device and operates the rigid mechanical equation to obtain a kinetic friction force of the plurality of dynamic parameters.

19. A mechanical arm control method, performed by a mechanical arm system, wherein the mechanical arm system comprises at least two links, at least two control devices and at least two motor devices, wherein the at least two control devices respectively control the corresponding at least two motor devices to adjust positions of the corresponding at least two links, wherein each of the at least two control devices performs the mechanical arm control method, comprising:

receiving an end-position command to output a first torque signal;

receiving the first torque signal and operating a rigid mechanical model to obtain a rigid mechanical torque;

creating a mechanical arm model to obtain a target torque based on the rigid mechanical torque and a flexible mechanical model;

outputting a target position signal based on the target torque;

generating a driving signal to adjust a rotatory angle of the corresponding motor device based on the target position signal; and measuring the rotatory angle, a rotatory speed and a rotatory acceleration of the corresponding motor device;

wherein one of the at least two control devices receives rotatory angle, rotatory speed and rotatory acceleration of the corresponding motor devices of the other at least two control devices for adjusting the rigid mechanical model of the one of the at least two control devices to change the rigid mechanical torque.

20. The mechanical arm control method of claim 19, further comprising:

adjusting the mechanical arm model to change the target torque based on the adjusted rigid mechanical model for outputting a first feedback signal;

identifying that a difference between the end-position command and the first feedback signal falls outside of a first error range, the first torque signal is adjusted.

* * * * *